(12) United States Patent
Rezvani et al.

(10) Patent No.: US 10,848,480 B2
(45) Date of Patent: Nov. 24, 2020

(54) SYSTEMS, APPARATUS, AND COMPUTER PROGRAM PRODUCTS INTEGRATING SIMPLE CERTIFICATE ENROLLMENT PROTOCOL INTO NETWORK DEVICE MANAGEMENT

(71) Applicant: KYOCERA Document Solutions Inc., Osaka (JP)

(72) Inventors: Hooman Majidzadeh Rezvani, Dublin, CA (US); Oleksandr Osadchyy, Concord, CA (US); Oleksandr Zinchenko, Concord, CA (US); Daisaku Nagano, Pleasant Hill, CA (US); Ankur Chhabra, Pleasanton, CA (US)

(73) Assignee: KYOCERA Document Solutions Inc.

( * ) Notice: Subject to any disclaimer, the term of this patent is extended or adjusted under 35 U.S.C. 154(b) by 207 days.

(21) Appl. No.: 16/035,255

(22) Filed: Jul. 13, 2018

(65) Prior Publication Data

US 2020/0021575 A1 Jan. 16, 2020

(51) Int. Cl.
*H04L 29/06* (2006.01)
*G06F 16/951* (2019.01)

(52) U.S. Cl.
CPC ........ *H04L 63/0823* (2013.01); *G06F 16/951* (2019.01); *H04L 63/083* (2013.01)

(58) Field of Classification Search
CPC ...... H04L 41/0806; H04L 41/08; G06F 21/44
See application file for complete search history.

(56) References Cited

U.S. PATENT DOCUMENTS

| | | | | |
|---|---|---|---|---|
| 8,392,712 B1 * | 3/2013 | Wilson | | H04L 63/08 713/175 |
| 9,154,307 B2 | 10/2015 | Hattori | | |
| 9,930,028 B2 | 3/2018 | Broeck et al. | | |
| 2006/0294366 A1 * | 12/2006 | Nadalin | | H04L 63/061 713/156 |
| 2018/0034646 A1 * | 2/2018 | Kuramoto | | H04L 9/3234 |
| 2018/0241574 A1 * | 8/2018 | Kakutani | | H04L 9/321 |
| 2018/0316510 A1 * | 11/2018 | Rai | | H04L 9/3268 |

* cited by examiner

*Primary Examiner* — Jason K Gee
(74) *Attorney, Agent, or Firm* — Law Office of Alexis J. Saenz

(57) ABSTRACT

A system, method, computer program product and apparatus provide an improvement to administration and management of security certificates in enterprise scale networks. An exemplary embodiment integrates a network device manager (NDM) with Simple Certificate Enrollment Protocol (SCEP) for administration and management of network equipment and for handling certificates for enterprise-scale implementation. The network device manager may control the settings and is configured to communicate with the firmware of end devices. The SCEP thus has a medium in the network device manager through which the SCEP features can be communicated to the end devices. In an exemplary embodiment, aspects of the system may for example, automatically check expiration of and renew certificates that are expiring.

14 Claims, 8 Drawing Sheets

SYSTEMS, APPARATUS, AND COMPUTER PROGRAM PRODUCTS INTEGRATING SIMPLE CERTIFICATE ENROLLMENT PROTOCOL INTO NETWORK DEVICE MANAGEMENT

CROSS-REFERENCE TO RELATED APPLICATION

None.

FIELD

The subject disclosure relates to network-based device management and more particularly to systems, processes, and computer program products integrating Simple Certificate Enrollment Protocol into network device management.

BACKGROUND

Enterprise scale systems have administrators that commonly need to monitor and maintain the security for each device that they support. For example, a customer may have over 1000 multifunction printers (MFPs) and standalone printers that need to connect to the customer's network. Each device that can connect to the network is a potential security risk. A bank for example, may have an extensive network of connected devices such as MFPs and other printers for printing sensitive documents. The bank's network needs to be able to trust the end devices (MFP/printers).

Commonly, security certificates are issued to each device to authenticate their permitted presence in a smaller type network, however enterprise scale networks provide a challenge for administrators. It is known for example to use certificates that use the IEEE 802.1X protocol for authentication.

There exist problems trying to administer the security of enterprise scale networks because of the sheer size and the situation has been that way for many years. Security certificates commonly need to be renewed periodically which in and of itself can be difficult to manage/check on a daily basis for even smaller networks. In addition, issuing and checking security certificates involves creating and inputting challenge passwords. To date, administering the password process for smaller networks is typically done manually. To do so on an enterprise scale is impractical and requires several administrators considering an enterprise network may have a large number of (e.g. more than 1000) devices that need certificates checked and renewed.

As can be seen, there is a need to improve on the management of security certificates for enterprise scale network-based devices.

SUMMARY

In one aspect of the disclosure, a method of automated management of security certificates for a plurality of network connected devices, by a computer operated device manager is disclosed. The method comprises retrieving, by a computer processor, a root certificate from a simple certificate enrollment protocol (SCEP) server; accepting a challenge password for a device certificate that will be assigned to each of the plurality of network connected devices; obtaining, by the computer processor, the device certificates from the SCEP server for each of the plurality of network connected devices using the challenge password; validating, by the computer processor, the device certificates for each of the plurality of network connected devices by comparison to the root certificate; storing the device certificates for each of the plurality of network connected devices in a database; automatically periodically polling according to a schedule, by the computer processor, the device certificates on the plurality of network connected devices; querying, by the computer processor, the plurality of network connected devices for a status of their respective device certificates; determining, by the computer processor, whether the status of one of the device certificates for one of the plurality of network connected devices is within a predetermined time until an expiration of validity; automatically extracting, by the computer processor, a saved copy of said device certificate from storage in the database in response to the status being within the predetermined time until expiration of validity; renewing, by the computer processor, the status of said device certificate through the SCEP server; and assigning, by the computer processor, said device certificate on to the one of the plurality of network connected devices.

In another aspect, a computer program product for automated management of security certificates for a plurality of network connected devices is disclosed. The computer program product comprises a non-transitory computer readable storage medium having computer readable program code embodied therewith. The computer readable program code is configured, when executed by a computer processor, to: retrieve, by the computer processor, a root certificate from a simple certificate enrollment protocol (SCEP) server; accept a challenge password for a device certificate that will be assigned to each of the plurality of network connected devices; obtain, by the computer processor, the device certificates from the SCEP server for each of the plurality of network connected devices using the challenge password; validate, by the computer processor, the device certificates for each of the plurality of network connected devices by comparison to the root certificate; store the device certificates for each of the plurality of network connected devices in a database; automatically periodically poll according to a schedule, by the computer processor, the device certificates on the plurality of network connected devices; query, by the computer processor, the plurality of network connected devices for a status of their respective device certificates; determine, by the computer processor, whether the status of one of the device certificates for one of the plurality of network connected devices is within a predetermined time until an expiration of validity; automatically extract, by the computer processor, a saved copy of said device certificate from storage in the database in response to the status being within the predetermined time until expiration of validity; renew, by the computer processor, the status of said device certificate through the SCEP server; and assign, by the computer processor, said device certificate on to the one of the plurality of network connected devices.

In yet another aspect, an apparatus is disclosed which, comprises a computer in communication with a simple certificate enrollment protocol (SCEP) server and a plurality of network connected devices. The computer includes a software module for automated management of security certificates for the plurality of network connected devices. The software module is configured, when executed by a processor of the computer, to: retrieve, by the processor of the computer, a root certificate from a simple certificate enrollment protocol (SCEP) server; accept a challenge password for a device certificate that will be assigned to each of the plurality of network connected devices; obtain, by the processor of the computer, the device certificates from the SCEP server for each of the plurality of network connected devices using the challenge password; validate, by the processor of the computer, the device certificates for each of the plurality of network connected devices by comparison to the root certificate; store the device certificates for each of the plurality of network connected devices in a database; automatically periodically poll according to a schedule, by the processor of the computer, the device certificates on the plurality of network connected devices; query, by the processor of the computer, the plurality of network connected devices for a status of their respective device certificates; determine, by the processor of the computer, whether the status of one of the device certificates for one of the plurality of network connected devices is within a predetermined time until an expiration of validity; automatically extract, by the processor of the computer, a saved copy of said device certificate from storage in the database in response to the status being within the predetermined time until expiration of validity; renew, by the processor of the computer, the status of said device certificate through the SCEP server; and assign, by the processor of the computer, said device certificate on to the one of the plurality of network connected devices.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 5 is a screenshot of a user interface displaying for a network device manager and a device list for certificate enrollment in accordance with embodiments of the subject technology FIG. 6 is a screenshot of a user interface displaying a SCEP server configuration in accordance with embodiments of the subject technology

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of network security and administration.

Generally, embodiments of the disclosure below leverage aspects of the Simple Certificate Enrollment Protocol (SCEP) for administration and management of network equipment and for handling certificates for large-scale implementation by everyday users. However, as will be appreciated, the firmware in many end devices such as MFPs/printers do not support SCEP which means the devices cannot connect to a SCEP server directly. In an exemplary embodiment, a network device manager that can manage the settings of end devices integrates its functionality with a SCEP server to provide an administrator with the tools to communicate with and manage the end devices with the benefits of security certificate protocols of SCEP. This combination of features will solve a customer's need to manage certificates for over 1000 devices and improve their network security.

Definitions/Acronyms

NDM: Network Device Manager

SCEP: Simple Certificate Enrollment Protocol

CSR: Certificate Signing Request

Challenge password: SCEP server creates a "challenge password" that must be delivered to the requester and then included with the submission back to the server.

CA: Certificate Authority

MAC Address: Media Access Control Address

IP Address: Internet Protocol Address

FQDN: Fully Qualified Domain Name

Renewal (Certificate): Renewing the validity of an expired device certificate with an SCEP server Re-enroll (Certificate): Enrolling a valid certificate removed from its slot on an end device with the SCEP server Rollover (Certificate): To restart the validity of a device certificate at the time of expiry of root certificate.

Figure 1:
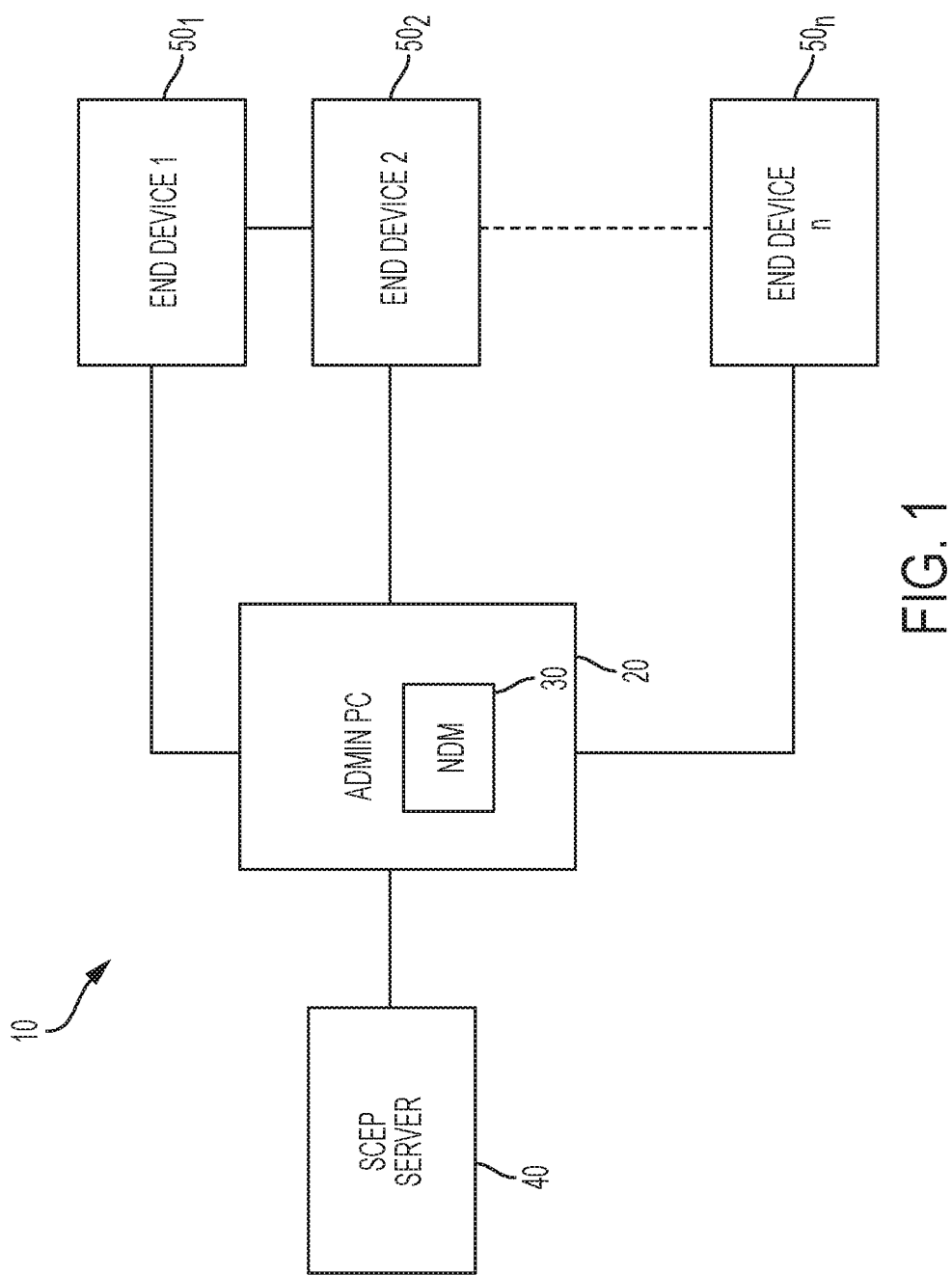
FIG. 1 is a block diagram of a system for automated management of security certificates for a plurality of network connected devices in accordance with an embodiment of the subject technology.

Referring now to FIG. 1, a block diagram of a system 10 is shown according to an exemplary embodiment. The system 10 comprises a general computing device 20 (which may be for example, a terminal operated by a network administrator), that includes a network device manager 30. The system 10 also comprises a SCEP server 40 in communication with the computing device 20. The computing device 20 may be in communication with end devices $50_1$, $50_2, \ldots 50_n$ (sometimes referred to generally as devices 50) in an enterprise scale network The enterprise scale network may have for example one thousand or more end devices 50. The end devices 50 may be for example, printers or MFPs in one exemplary embodiment.

Figures 5, 6:
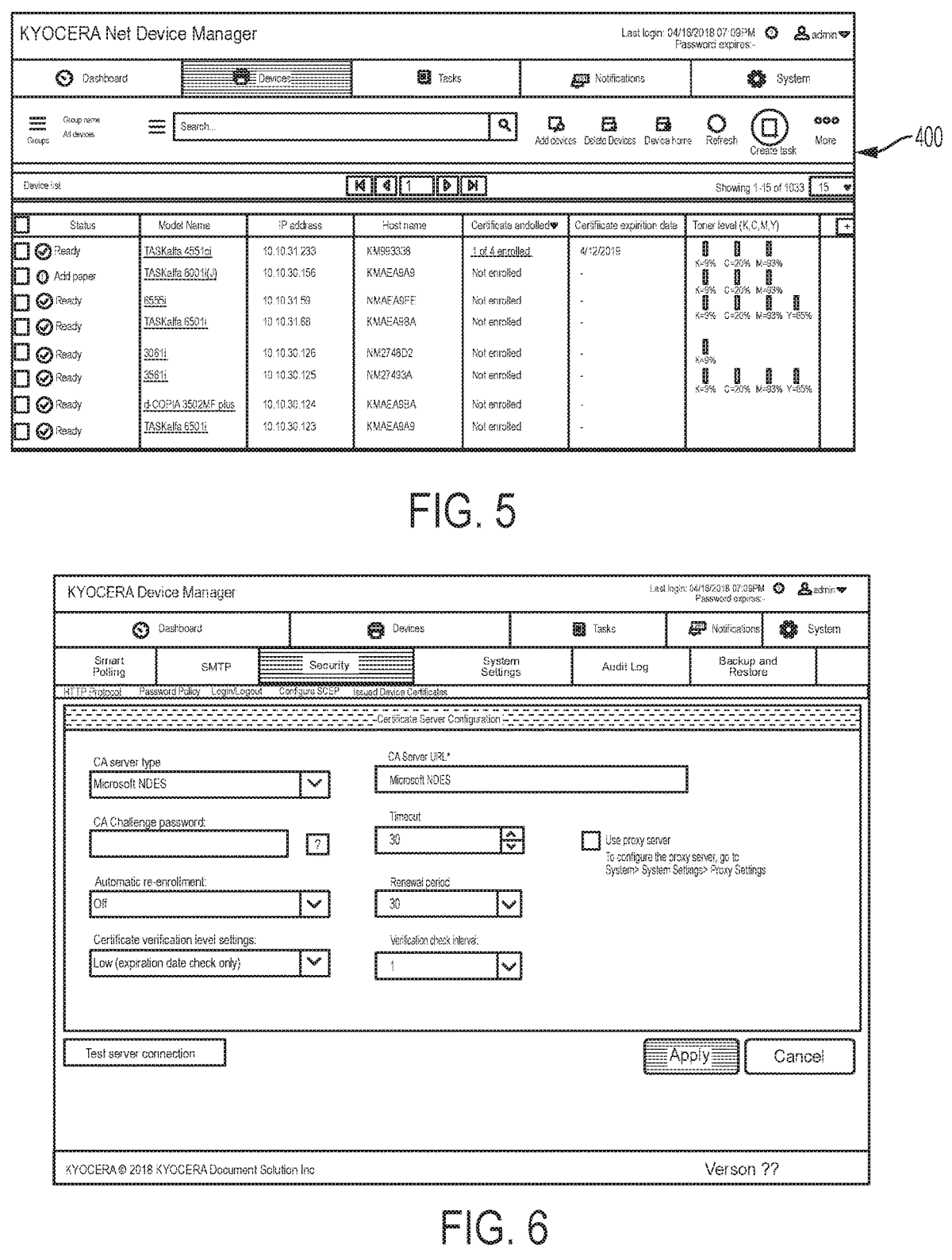

The NDM 30 may be a web-based software application for information technology (IT) administrators and service technicians to be able to manage printing devices in a centralized location. The NDM 30, in an exemplary embodiment, may be configured to monitor and manage up to 10,000 devices. Referring temporarily to FIG. 5, a UI dashboard 400 is shown according to an exemplary embodiment. The UI dashboard 400 includes several administrator selectable features to manage end devices 50 in the network. Some of the NDM 30 features are configured for an administrator to (on end devices 50):

Manage device certificate
Upgrade firmware
Configure settings
Install applications
Receive automated problem alerts
Check toner levels at a glance
Generate device reports
Arrange devices in groups
Manage Applications in end devices
Manage device address book entries
Manage custom and fax boxes. Set quotas and other properties.
Being able to activate optional device functions such as Data Security Kit or Internet FAX Kit.

The integration of NDM 30 with SCEP security will improve network security for customers by automating certificate management and ensuring validity of certificates on a large number of devices. Embodiments will allow administrators to simplify the installation of security by deploying certificates to multiple end devices 50. In an exemplary embodiment, an NDM polling and monitoring feature will automatically handle checking the status of certificates to determine if they are near an expiration date for validity. By polling, the NDM 30 will know which certificate should be renewed or which certificate should be re-enrolled in the SCEP server 40. When the status of a certificate shows it is near expiration (or has expired), the NDM 30 may automatically renew the certificate with the SCEP server 40. If the status shows a valid certificate has been inadvertently removed from its device slot, the NDM 30 may automatically re-enroll the certificate with the SCEP server 40. Automatically coordinating renewal/re-enrollment of certificates with the SCEP server 40 will let the customer be confident that their network MFPs and printers will always have a trusted and valid certificate. It will also be appreciated that aspects of the NDM 30 bring more functional visibility to the customer by listing through a user interface (UI) (seen for example in FIG. 5 below) all devices enrolled and not-enrolled in the system 10. This allows the administrator to accurately manage and troubleshoot security in the network. Accordingly, certificate management can be more productive and reliable within an enterprise scale network.

For the following flowcharts, steps of the processes may be referred to as blocks and/or by reference numeral. As will be described further below, steps may be performed by a machine, for example, a computing device and/or a processing unit. While the steps may be described in one order, it will be understood that variations to the order may be practiced or the order in which claims below are written may vary from the following without departing from the scope of the invention.

Figure 2:
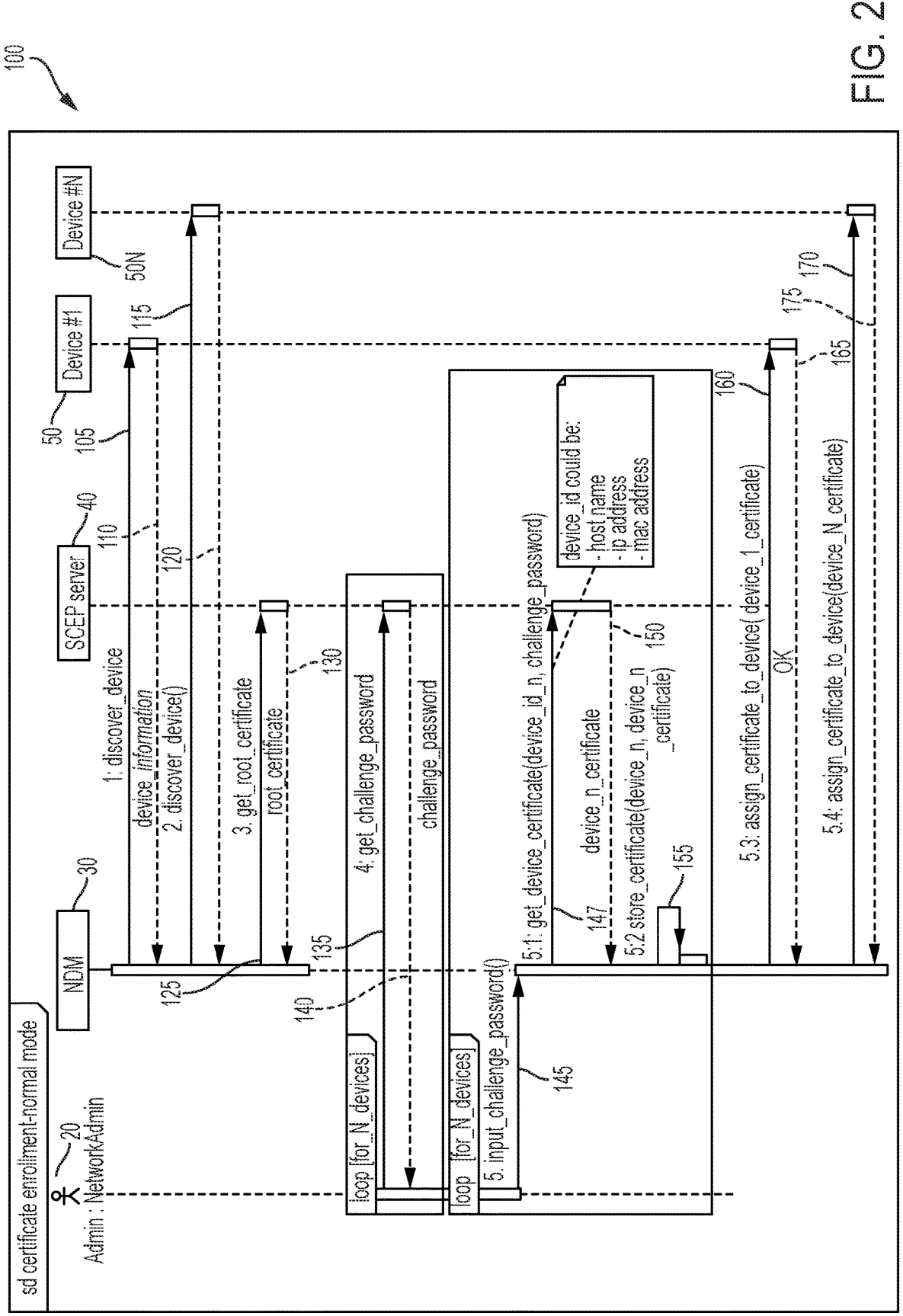
FIG. 2 is a flowchart of a method of device certificate enrollment through an SCEP server in normal mode in accordance with an embodiment of the subject technology.
Figures 7, 8:
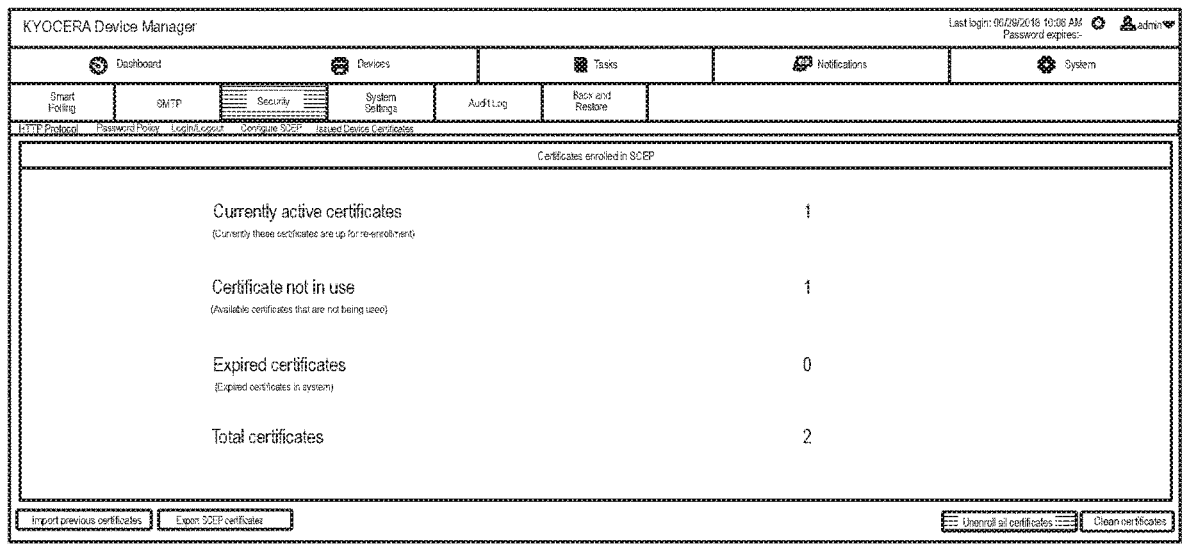
FIG. 7 is a screenshot of a user interface displaying a summary of certificates from end devices within an enterprise scale network enrolled in a SCEP server in accordance with embodiments of the subject technology.
FIG. 8 is a screenshot of a user interface displaying admin tools to set SCEP settings in accordance with embodiments of the subject technology.
Figure 9:
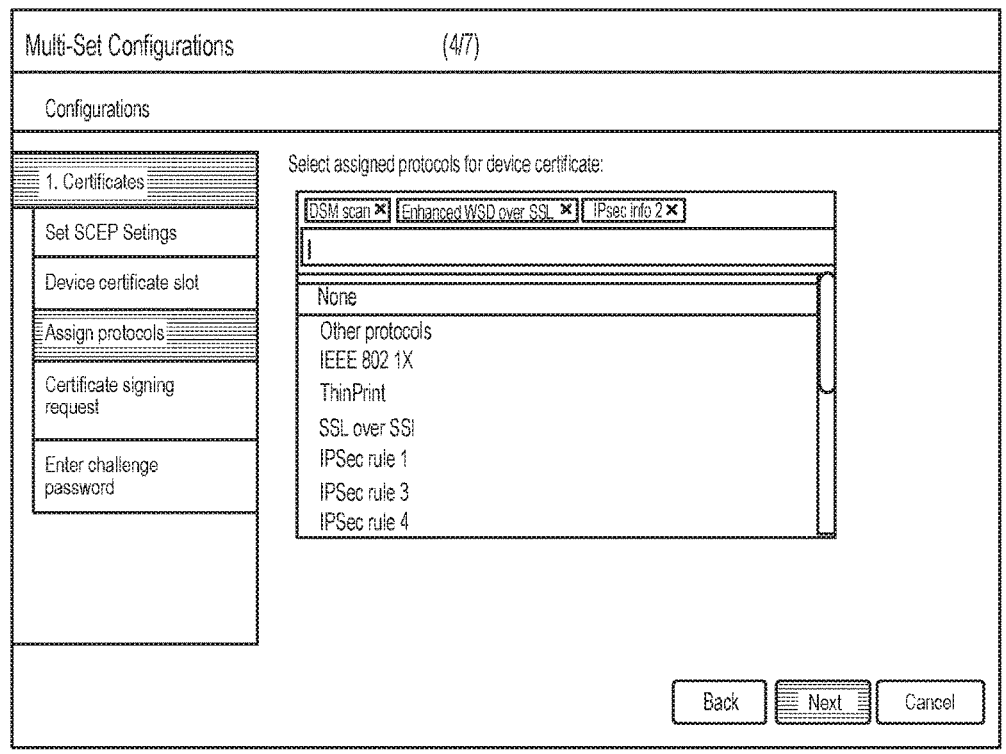
FIG. 9 is a screenshot of a user interface displaying admin tools to assign a protocol to a certificate in accordance with embodiments of the subject technology.

Referring now to FIG. 2, a method 100 of certificate enrollment with a system integrating a SCEP server 40 (in normal mode) with a network device manager 30 is shown according to an exemplary embodiment. In normal mode, the SCEP server 40 requires input of a separate challenge password for each certificate. Thus, if 1000 certificates should be enrolled, then 1000 challenge passwords are required. In a conventional manual approach, this is a daunting task for administrators. However, in the exemplary embodiment integrating an NDM with the SCEP, managing challenge passwords on an enterprise scale becomes much more feasible and efficient. FIG. 8 shows a screenshot of an NDM UI where the administrator may configure SCEP settings for certificates. FIG. 9 shows an NDM UI page specifically for setting the protocol for a certificate.

In block 105, the NDM 30 automatically searches through the network and discovers an end device 50 in the network. In block 110, the device information for the end device 50 is relayed back to the NDM 30. The discovery and information relay process may be repeated for each device 50 in blocks 115 and 120. In block 125, the NDM 30 obtains the root certificate from the SCEP server 40. In block 130, the NDM 30 may validate the root certificate itself. Validation may in some embodiments include the NDM 30 obtaining the root certificate which the user may review and validate. In some embodiments, the SCEP server 40 may connect to a Certificate Authority (CA) server to obtain the root certificate.

Figure 10:
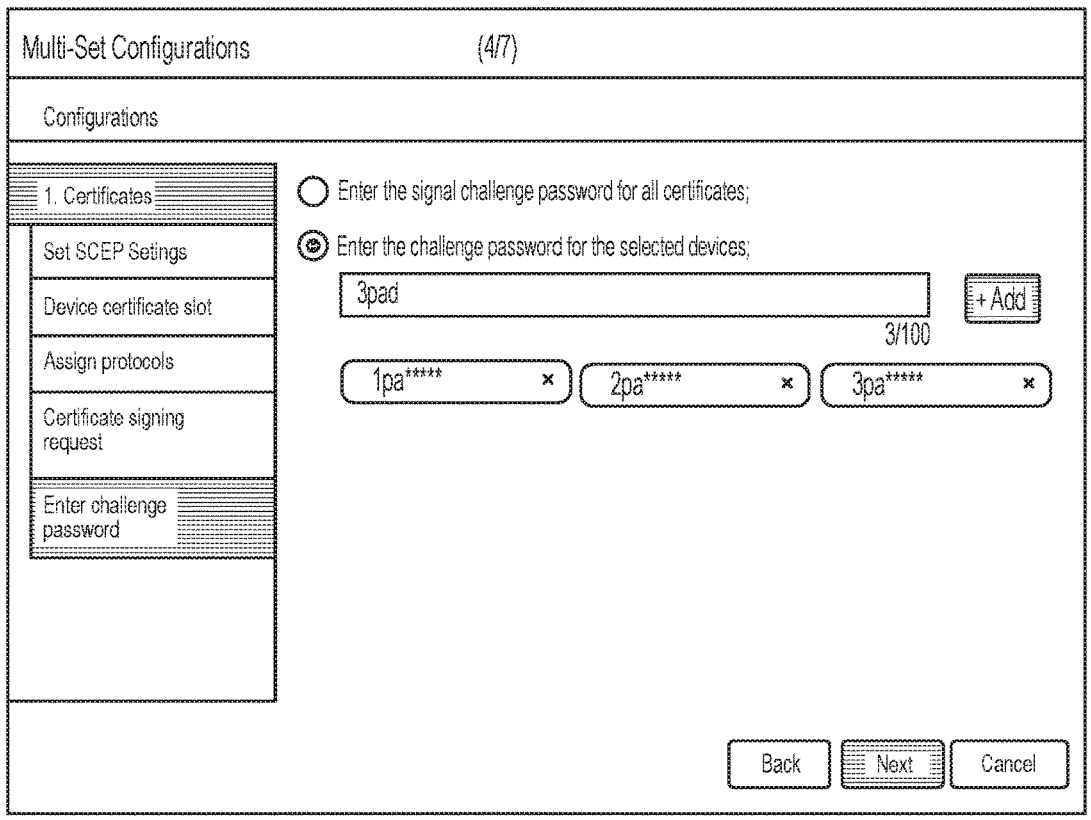
FIG. 10 is a screenshot of a user interface displaying admin tools to set a challenge password for a certificate in accordance with embodiments of the subject technology.

In block 135, a network administrator 20 may use a bash script, web UI, or any other flexible method to generate N number of challenge passwords on the SCEP server side. In block 140, the network administrator 20 may input the N previously generated challenge passwords to the NDM 30. FIG. 10 shows a screenshot of an example NDM UI where the administrator may enter a challenge password for selected devices under normal mode. However, as can be seen, the UI also includes a feature for conveniently switching to single-password mode from the same page, which can be used to the administrator's selective advantage as discussed below with respect to FIG. 3.

In block 145, the NDM 30 may use every challenge password to obtain (block 150) the device certificate from the SCEP server 40. In one embodiment, in block 147, the obtained device certificate may be checked for its validity status against the root certificate (obtained in block 130). Validation may in some embodiments include the NDM 30 obtaining the root certificate which the user may review and use to validate the device certificate. In block 155, the NDM 30 may store the obtained device certificate from a database. The stored certificate may later be used for renewal/rollover operations. FIG. 7 shows a screenshot of an NDM 30 UI with a summary and links to access stored certificates. As will be understood, the numbers shown are placeholders only for sake of illustration. In some embodiments, the NDM 30 UI includes a purging feature for purging expired certificates or certificates that are no longer enrolled. In FIG. 7, this may be represented by the button labeled "Clean certificates". The purging feature may be useful, for example, when device certificates were previously manually enrolled and the user may want the NDM 30 to take over administration of device certificates. The user may, by invoking the purging feature, clear the device certificates that were manually enrolled (or all certificates altogether if necessary) and restart administration and management of device certificates using the embodiments disclosed.

In block 160, the NDM 130 assigns the generated certificates to an end device 50. In block 165, the end device 50 acknowledges receipt of the certificate. The processes of assigning and acknowledging certificates may be repeated for each end device 50 in blocks 170 and 175.

Figure 3:
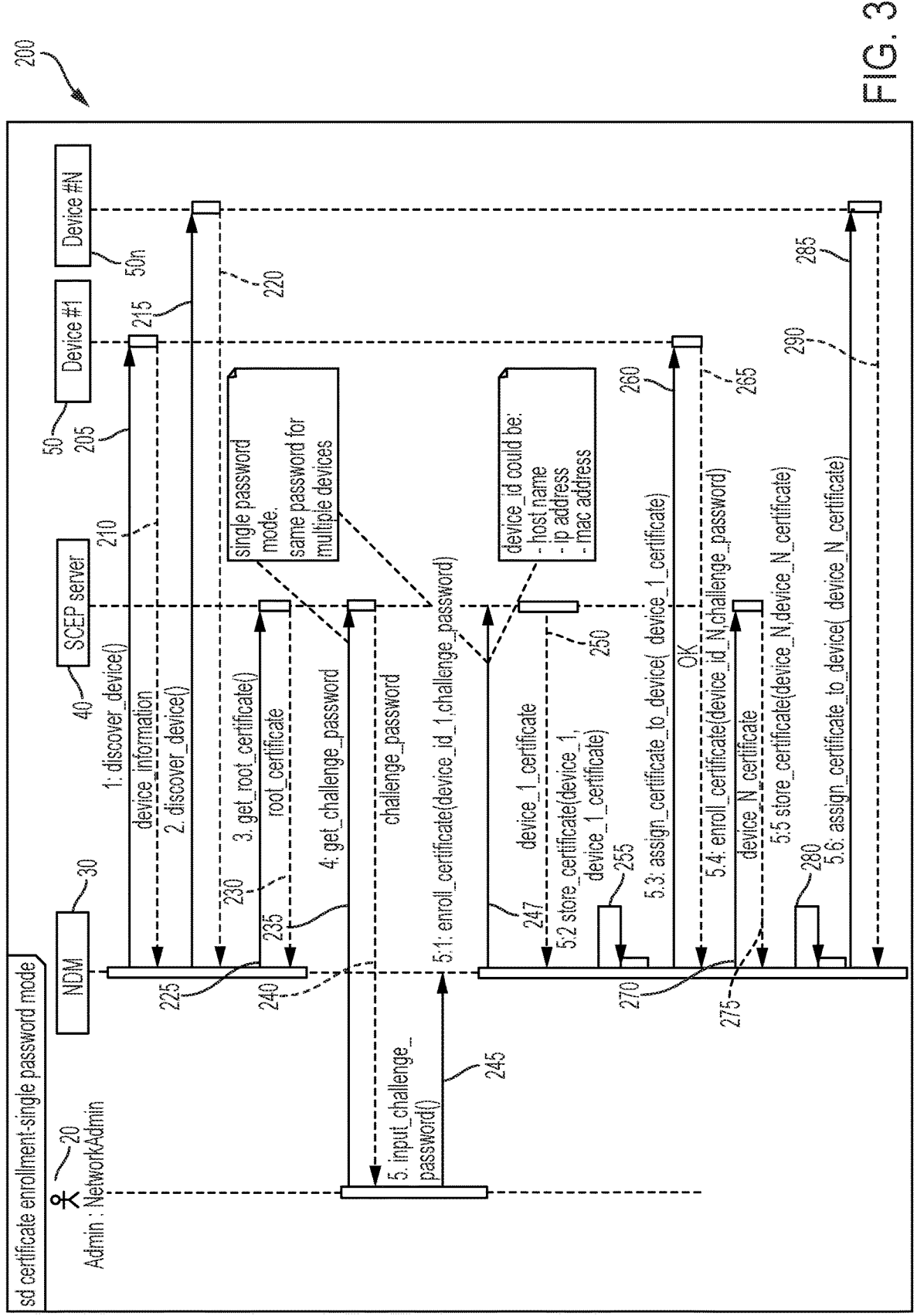
FIG. 3 is a flowchart of a method of device certificate enrollment through an SCEP server in single-password mode in accordance with an embodiment of the subject technology.

Referring now to FIG. 3, a method 200 of device certificate enrollment through an SCEP server in single-password mode is shown according to an exemplary embodiment. In single password mode the SCEP server 40 allows the administrator to use one challenge password to generate an unlimited number of security certificates. For example, to enroll 10000 certificates only 1 challenge password is required under single password mode. While this may present a potential security risk if used on a constant basis, as will be appreciated, some embodiments may operate the NDM 30 to leverage the convenience of the single password mode to temporarily use a single challenge password during device enrollment and the administrator may then switch back to the SCEP normal mode thereafter to increase the security level of the network. In the method 200, the processes in blocks 205 through 230 are similar to the processes of blocks 105 through 130 of method 100 and for sake of being concise, will not be repeated. Thus, the reader may jump to block 235 where the network administrator may use a bash script, web UI or, any other flexible method to generate one challenge password on the SCEP server side. In block 240, the network administrator inputs the previously generated challenge password to the NDM 30. In block 245, using the same challenge password input by the administrator, the NDM 30 may make the request in block 247 to enroll an end device 50 with the SCEP server 40. The SCEP server 40 sends in block 250, the device certificate to the NDM 30. Here the obtained certificate could be validated against the root certificate (obtained in block 230). In block 255, the NDM 30 stores the obtained certificate in the database. The stored certificate later could be used for renewal/rollover operations. In block 260, the NDM may assign the generated certificate to the end device 50 that was enrolled. Acknowledgement of the assigned certificate and enrollment may be performed in block 265.

In an exemplary embodiment, the NDM 30 may automatically repeat the processes in blocks 247 through 265 described above using the single challenge password already input by the administrator, for each of the end devices 50. The repeated processes are represented by blocks 270 through 290 in FIG. 3. As will be appreciated, this process may be performed not only for the entire network of end devices but on-demand if for example, a new group of end devices are being added to the network and need security certificates. Once the security certificates are enrolled for the group of end devices, the NDM 30 may automatically switch the SCEP server 40 back to normal mode (or an administrator may manually switch the mode back).

Figure 4:
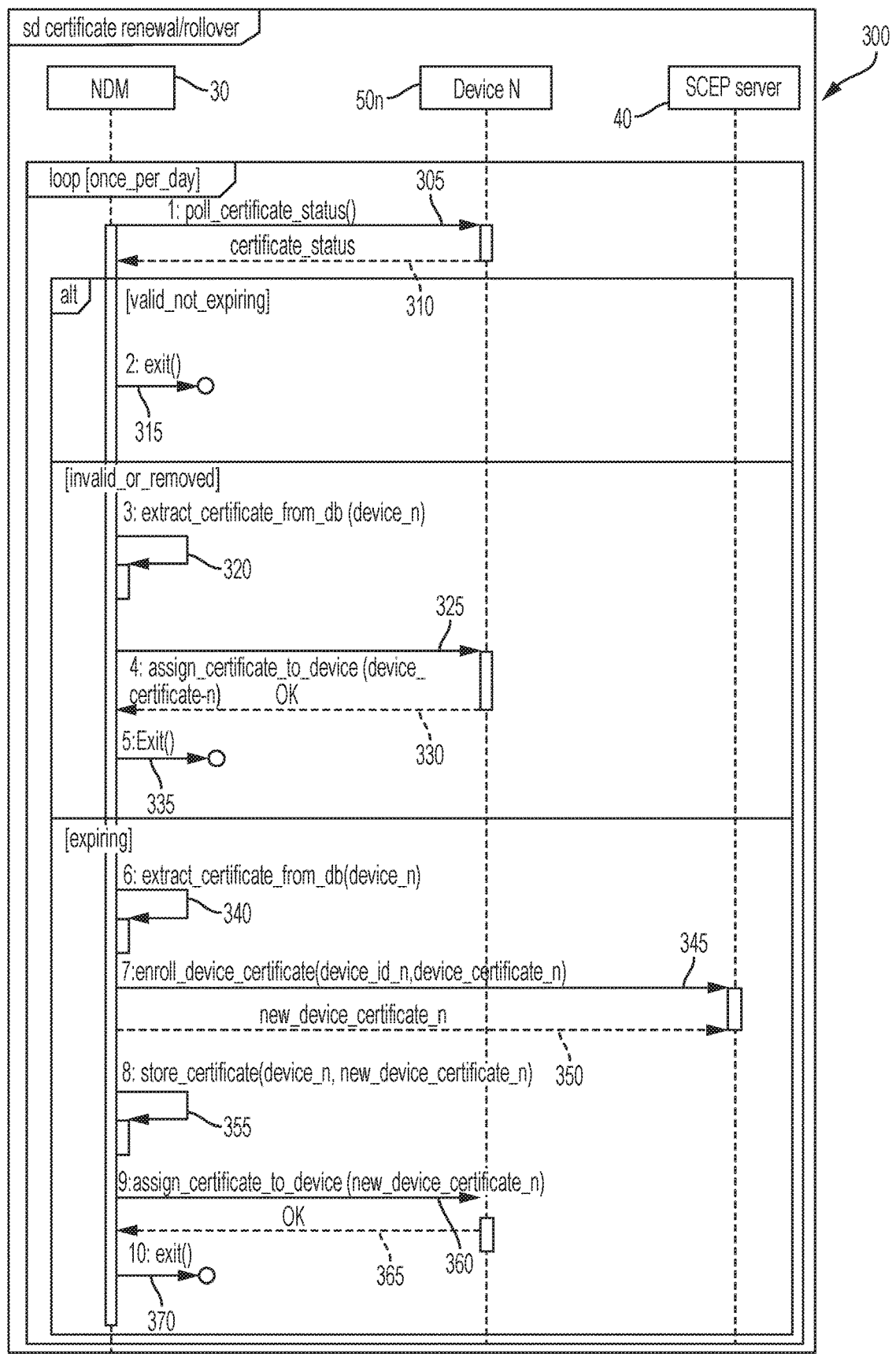
FIG. 4 is a flowchart of a method of automatic device certificate renewal and rollover in accordance with embodiments of the subject technology.

Referring now to FIG. 4, a method 300 of device certificate renewal and rollover is shown according to an exemplary embodiment. The method 300 describes renewal/rollover of a previously enrolled certificate. As will be appreciated, aspects of the method 300 are automated and save an administrator substantial time and manpower in monitoring and updating the validity of end device certificates. Under conventional approaches, an admin team needed to manually check the status of each end device's certificate or a customer needed to inform the administrator that the network determined that their device no longer had a valid certificate status. The method 300 however, which uses the NDM 30 to communicate with each end device 50, can automatically check each end device for certificate status. If needed, the NDM 30 may remove, replace, or renew a security certificate for the end device 50 without the administrator having to manually perform the action once the device is enrolled in the NDM 30 list of enrolled end devices 50.

In block 305, the NDM 30 may periodically poll and query the status of certificates on each managed end device 50 in the network. The frequency of polling and querying may be set by the administrator according to a schedule through a UI in the NDM 30, (for example, once per day). The NDM 30 stores a list of each end device being managed in the network and thus, can automatically query each device by sending a message to each device's address (which may be for example, an IP address, a MAC address, a fully qualified domain name, or other type of device address), in the network. See for example, the screenshot shown in FIG. 5 of the UI 400 which shows a device list and associated respective addresses. This eliminates the administrator's typical need to check each device individually and manually. In block 310, the end device 50 may respond to the query with a status of its security certificate. Depending on the status of the security certificate, a variety of responses may trigger the NDM 30 to perform a security certificate related action that may involve the SCEP server 40.

For example, if the certificate on the device is valid and not expiring the NDM 30 may do nothing in block 315 and may move on to the next end device 50.

If the certificate is invalid, for example, because the previously valid certificate on the specified device slot has been replaced with some invalid certificate or has been removed, the NDM 30 may in block 320 extract a previously saved copy of the certificate from the database. The NDM 30 may in block 325 assign the certificate back to the end device 50. The end device 50, in block 330, returns back to a valid certificate state, and the NDM 30 exits from its check of the end device 50 in block 335.

In an exemplary embodiment, in block 340, if the certificate on the device side is about to expire, the NDM 30 extracts the previously saved copy of the security certificate from the database. The administrator may have previously set through a UI (see FIG. 6) in the NDM 30, a predetermined threshold time until certificate expiration as the criterion for renewing the certificate. The predetermined threshold time may be user-defined as set by the administrator or for example, set according to the system configuration of the SCEP server 40, and/or NDM 30 and/or the certificate settings itself. For example, an industry standard is to set the validity of a security certificate to last one year. The threshold for renewing a certificate may be set to 30 days before the end of the expiration period. As will be appreciated, the process automatically manages the check for validity and renewal with a buffer so that the end devices 50 retain their validity without the security status expiring. Or if the end devices 50 have lost their validity for some reason, the validity is renewed within the frequency (shown as 1 day in the filed "verification check interval" in FIG. 6) of checking set by the administrator. This keeps the end devices secure and available for functioning within the network, which promotes productivity.

In block 345, the NDM 30 may rely on the extracted certificate being valid to renew the enrollment of the end device's certificate with the SCEP server 40. The SCEP server 40 may in block 350, acknowledge enrollment/renewal of certificate with the NDM 30. In block 355, the renewed certificate is stored in the database for future usage.

In block 360, the NDM 30 assigns the renewed certificate to the end device 50 which may acknowledge the assignment in block 365. The process may terminate for the end device 50 in block 370.

Figure 11:
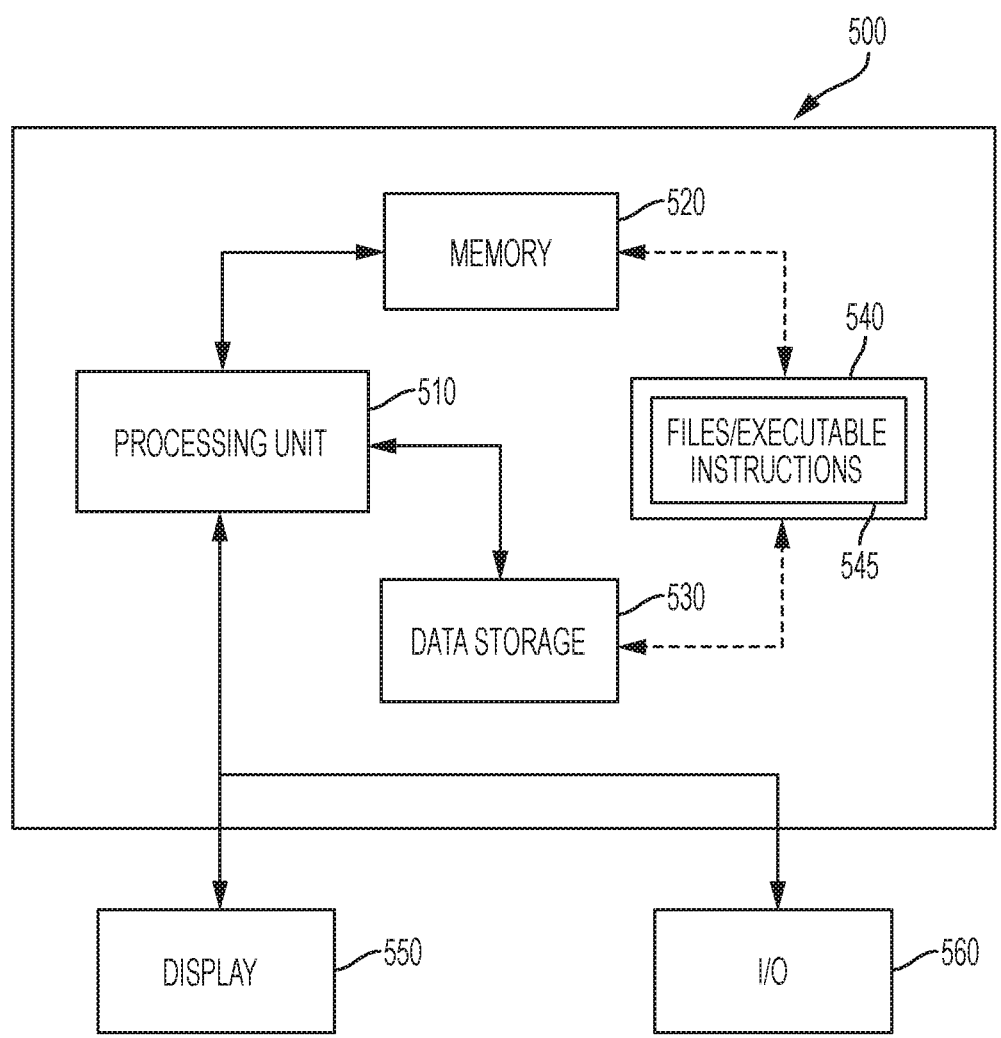
FIG. 11 is a block diagram of a computing device in accordance with an aspect of the subject technology.

Referring now to FIG. 11, a schematic of an example of a computing device 500 is shown. The computing device 500 may be for example, a computer system, a computer server, or a computing based image processing and printing device (for example a printer or MFP as described above). As will be appreciated, some aspects of the embodiments disclosed above may turn the computing device 500 into a special purpose computer system that specifically manages, monitors, and renews security certificates for enterprise scale networks. For example, in the role of a host server, the computing device 500 may implement for example the functions of storing security certificates, scheduling querying of end device certificate status, determining validity of certificate statuses, check for certificates within a user selected time before expiration of a certificate validity, and automatically renew certificates within the time before validity expires. In some embodiments, the NDM 30 operates through a server with a GUI. In some embodiments, the SCEP server 40 is a server but not necessarily a host server for providing management of the network device certificates.

In the role of a user device, the computing device 500 is generally not a server but may instead be desktop computers, tablet or laptop computers, all-in-one computer stations, a mobile computing device (for example, a smart phone, smart wearable devices (glasses, jewelry, watches, ear wear, etc.)), or programmable electronics. As a user device, the computing device 500 may generally be operated by an administrator with authority to manage security within a network. As described above for example this may be the admin PC 20 in FIG. 1.

When the computing device 500 is an image processing system (for example, a printer or MFP), the printer or MFP is usually an end device in the network that is the subject of being monitored and checked for certificate validity. Accordingly, embodiments do not typically use the end device for an administrator to manage other end devices in the network and it should be understood by the reader when reading the context of the description below that the computing device 500 is a device for administering the network or the computing device is an end device.

The components of the computing device 500, may include, but are not limited to, one or more processors or processing units 510, a system memory 520, data storage 530, a computer program product 540 having a set of program modules 545 including files and executable instructions, and a bus system that couples various system components including the system memory 520 to the processor(s) 510. In some embodiments, the processors 510 may include a processing unit dedicated to graphics and image processing (for example a graphics processing unit (GPU) or visual processing unit (VPU). As a GPU or VPU, the processor 510 may implement executable instructions focused on image processing applications either alone or in coordination with other general processor 510 types such a CPUs, microchips, and the like.

The computing device 500 may be described in the general context of computer system executable instructions, such as the program modules 545 which represent a software embodiment of the system and processes described generally above with respect to FIGS. 1-4. In an exemplary embodiment, the program modules may include a version of the NDM 30 configured to integrate with the functions of the SCEP. The program modules 545 generally carry out the functions and/or methodologies of embodiments as described above. As such, while not described in detail, the software modules generally referred to above may be understood to be one example of program modules 545.

The computing device 500 may typically include a variety of computer system readable media. Such media could be chosen from any available media that is accessible by the computing device 500, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 520 could include one or more computer system readable media in the form of volatile memory, such as a random-access memory (RAM) and/or a cache memory. By way of example only, the data storage system 530 may read from and write to a non-removable, non-volatile magnetic media device. The system memory 520 may include at least one program product 540 having a set of program modules 545 that are configured to carry out the functions of embodiments of the invention in the form of computer executable instructions. The program product/utility 540, having a set of program modules 545, may be stored in the system memory 520 by way of example, and not limitation, as an operating system, one or more application programs, other program modules, and program data.

The computing device 500 may communicate with one or more external devices including for example, an electronic display 550 which may in some embodiments be configured for tactile response as in a touch screen display. User input into the display 550 may be registered at the processor 510 and processed accordingly. Other devices may enable the computing device 500 to communicate with one or more other computing devices (for example communicating between the admin PC 20, the SCEP server 40 and the end devices 50), either by hardwire or wirelessly. Such communication can occur via Input/Output (I/O) interfaces/ports 560. In some embodiments, the I/O interfaces/ports 560 may be specially configured to handle aspects of the embodiments described herein converting the computing device 500 into a special purpose machine. For example, as an admin PC 20, the I/O interfaces/ports 560 may be configured to transmit messages querying by an automatic polling schedule to address of end devices that are already known based on data from stored files. As such the device 500 may become dedicated to the role of managing cybersecurity in the network.

The computing device 500, through the I/O interface/ports 560, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 500 may be a cloud computing node connected to a cloud computing network (not shown). The computer computing device 500 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 550 which may be controlled via direct contact with the display 550 or via the I/O interfaces 560 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 510 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of automated management of security certificates for a plurality of network connected devices, by a computer operated device manager, comprising:
retrieving, by a computer processor, a root certificate from a simple certificate enrollment protocol (SCEP) server;
accepting a challenge password for a device certificate that will be assigned to each of the plurality of network connected devices, wherein the step of accepting a challenge password includes,
operating the computer operated device manager according to a first mode of the SCEP server that accepts different passwords for different network connected devices, and
switching the SCEP server to a second mode that accepts a single password for a set of network connected devices receiving a new device certificate respectively, and in response to the set of network connected devices receiving a new device certificate, switching the SCEP server back to the first mode;
obtaining, by the computer processor, the device certificates from the SCEP server for each of the plurality of network connected devices using the challenge password;
validating, by the computer processor, the device certificates for each of the plurality of network connected devices by comparison to the root certificate;
storing the device certificates for each of the plurality of network connected devices in a database;
automatically periodically polling according to a schedule, by the computer processor, the device certificates on the plurality of network connected devices;

querying, by the computer processor, the plurality of network connected devices for a status of their respective device certificates;
determining, by the computer processor, whether the status of one of the device certificates for one of the plurality of network connected devices is within a predetermined time until an expiration of validity;
automatically extracting, by the computer processor, a saved copy of said device certificate from storage in the database in response to the status being within the predetermined time until expiration of validity;
renewing, by the computer processor, the status of said device certificate through the SCEP server; and
assigning, by the computer processor, said device certificate on to the one of the plurality of network connected devices.

2. The method of claim 1, further comprising:
determining, by the computer processor, whether the status of one of the device certificates for one of the plurality of network connected devices is invalid;
automatically extracting, by the computer processor, a saved copy of said device certificate from storage in the database in response to the status being invalid; and
automatically replacing said device certificate with the saved copy.

3. The method of claim 1, wherein the step of accepting a challenge password is performed by accepting different passwords for each device certificate on the different network connected devices.

4. The method of claim 1, wherein the step of accepting a challenge password is performed by accepting a single password usable for each device certificate on all of the plurality of network connected devices.

5. The method of claim 1, further comprising:
receiving an administrator request to replace one or more stored device certificates for one or more of the plurality of network connected devices;
obtaining a new device certificate(s) for the one or more of the plurality of network connected devices using a single-password mode for generating the challenge password for the one or more of the plurality of network connected devices; and
storing the new device certificate(s) in the database for the one or more of the plurality of network connected devices.

6. A computer program product for automated management of security certificates for a plurality of network connected devices, the computer program product comprising a non-transitory computer readable storage medium having computer readable program code embodied therewith, the computer readable program code being configured, when executed by a computer processor, to:
retrieve, by the computer processor, a root certificate from a simple certificate enrollment protocol (SCEP) server;
accept a challenge password for a device certificate that will be assigned to each of the plurality of network connected devices, wherein the step of accepting a challenge password includes,
operating according to a first mode of the SCEP server that accepts different passwords for different network connected devices, and
switching the SCEP server to a second mode that accepts a single password for a set of network connected devices receiving a new device certificate respectively, and in response to the set of network connected devices receiving a new device certificate, switching the SCEP server back to the first mode;
obtain, by the computer processor, the device certificates from the SCEP server for each of the plurality of network connected devices using the challenge password;
validate, by the computer processor, the device certificates for each of the plurality of network connected devices by comparison to the root certificate;
store the device certificates for each of the plurality of network connected devices in a database;
automatically periodically poll according to a schedule, by the computer processor, the device certificates on the plurality of network connected devices;
query, by the computer processor, the plurality of network connected devices for a status of their respective device certificates;
determine, by the computer processor, whether the status of one of the device certificates for one of the plurality of network connected devices is within a predetermined time until an expiration of validity;
automatically extract, by the computer processor, a saved copy of said device certificate from storage in the database in response to the status being within the predetermined time until expiration of validity;
renew, by the computer processor, the status of said device certificate through the SCEP server; and
assign, by the computer processor, said device certificate on to the one of the plurality of network connected devices.

7. The computer program product of claim 6, further comprising computer readable code configured to:
determine, by the computer processor, whether the status of one of the device certificates for one of the plurality of network connected devices is invalid;
automatically extract, by the computer processor, a saved copy of said device certificate from storage in the database in response to the status being invalid; and
automatically replace said device certificate with the saved copy.

8. The computer program product of claim 6, wherein the step of accepting a challenge password is performed by accepting different passwords for each device certificate on the different network connected devices.

9. The computer program product of claim 6, wherein the step of accepting a challenge password is performed by accepting a single password usable for each device certificate on all of the plurality of network connected devices.

10. The computer program product of claim 6, further comprising computer readable code configured to:
receive an administrator request to replace one or more stored device certificates for one or more of the plurality of network connected devices;
obtain a new device certificate(s) for the one or more of the plurality of network connected devices using a single-password mode for generating the challenge password for the one or more of the plurality of network connected devices; and
store the new device certificate(s) in the database for the one or more of the plurality of network connected devices.

11. An apparatus, comprising:
a computer in communication with a simple certificate enrollment protocol (SCEP) server and a plurality of network connected devices, wherein the computer includes a software module for automated management of security certificates for the plurality of network connected devices, the software module configured, when executed by a processor of the computer, to:

retrieve, by the processor of the computer, a root certificate from a simple certificate enrollment protocol (SCEP) server;
accept a challenge password for a device certificate that will be assigned to each of the plurality of network connected devices, wherein the processor of the computer accepts a challenge password by,
    operating the software module according to a first mode of the SCEP server that accepts different passwords for different network connected devices; and
    switching the SCEP server to a second mode that accepts a single password for a set of network connected devices receiving a new device certificate respectively, and in response to the set of network connected devices receiving a new device certificate, switching the SCEP server back to the first mode;
obtain, by the processor of the computer, the device certificates from the SCEP server for each of the plurality of network connected devices using the challenge password;
validate, by the processor of the computer, the device certificates for each of the plurality of network connected devices by comparison to the root certificate;
store the device certificates for each of the plurality of network connected devices in a database;
automatically periodically poll according to a schedule, by the processor of the computer, the device certificates on the plurality of network connected devices;
query, by the processor of the computer, the plurality of network connected devices for a status of their respective device certificates;
determine, by the processor of the computer, whether the status of one of the device certificates for one of the plurality of network connected devices is within a predetermined time until an expiration of validity;
automatically extract, by the processor of the computer, a saved copy of said device certificate from storage in the database in response to the status being within the predetermined time until expiration of validity;
renew, by the processor of the computer, the status of said device certificate through the SCEP server; and
assign, by the processor of the computer, said device certificate on to the one of the plurality of network connected devices.

12. The apparatus of claim 11, wherein the software module is further configured to:
determine, by the processor of the computer, whether the status of one of the device certificates for one of the plurality of network connected devices is invalid;
automatically extract, by the processor of the computer, a saved copy of said device certificate from storage in the database in response to the status being invalid; and
automatically replace said device certificate with the saved copy.

13. The apparatus of claim 11, wherein the processor of the computer accepts a challenge password by accepting different passwords for each device certificate on the different network connected devices.

14. The apparatus of claim 11, wherein the processor of the computer is further configured to:
receive an administrator request to replace one or more stored device certificates for one or more of the plurality of network connected devices;
obtain a new device certificate(s) for the one or more of the plurality of network connected devices using a single-password mode for generating the challenge password for the one or more of the plurality of network connected devices; and
store the new device certificate(s) in the database for the one or more of the plurality of network connected devices.

* * * * *